US008662833B2

(12) United States Patent
Wengert et al.

(10) Patent No.: US 8,662,833 B2
(45) Date of Patent: Mar. 4, 2014

(54) TURBOCHARGER WITH VARIABLE TURBINE GEOMETRY

(75) Inventors: Andreas Wengert, Auenwald (DE); Timo Tries, Schwieberdingen (DE); Matthias Stein, Korntal-Muenchingen (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 963 days.

(21) Appl. No.: 12/687,371

(22) Filed: Jan. 14, 2010

(65) Prior Publication Data

US 2010/0196146 A1    Aug. 5, 2010

(30) Foreign Application Priority Data

Jan. 15, 2009    (DE) .................... 10 2009 004 737

(51) Int. Cl.
*F01D 11/00*    (2006.01)
(52) U.S. Cl.
USPC .......................................... 415/160; 415/206
(58) Field of Classification Search
USPC ...................... 415/163, 164, 165, 206, 160
See application file for complete search history.

(56) References Cited

U.S. PATENT DOCUMENTS

| 1,988,163 | A | * | 1/1935 | Church ........................ 417/323 |
| 3,975,911 | A | | 8/1976 | Morgulis et al. |
| 4,242,040 | A | * | 12/1980 | Swearingen .................. 415/113 |
| 4,420,160 | A | * | 12/1983 | Laham .......................... 277/306 |
| 4,659,295 | A | * | 4/1987 | Burdette et al. .............. 417/407 |
| 4,676,356 | A | * | 6/1987 | Beccaris et al. ............. 192/70.28 |
| 7,322,791 | B2 | * | 1/2008 | Stilgenbauer ................. 415/164 |
| 7,794,200 | B2 | * | 9/2010 | Mukherjee .................... 415/164 |
| 8,322,979 | B2 | * | 12/2012 | Walter et al. .................. 415/177 |
| 2006/0062663 | A1 | * | 3/2006 | Figura et al. .................. 415/160 |
| 2008/0075582 | A1 | * | 3/2008 | Sausse et al. ................. 415/159 |
| 2009/0060737 | A1 | * | 3/2009 | Frankenstein et al. ....... 415/229 |
| 2009/0092483 | A1 | * | 4/2009 | Yasui et al. ................... 415/159 |
| 2010/0196146 | A1 | * | 8/2010 | Wengert et al. .............. 415/163 |
| 2010/0232937 | A1 | * | 9/2010 | Wengert et al. .............. 415/160 |
| 2010/0316489 | A1 | * | 12/2010 | Hoecker et al. .............. 415/148 |
| 2011/0014033 | A1 | * | 1/2011 | Boning et al. ................ 415/148 |

FOREIGN PATENT DOCUMENTS

| DE | 102008000724 | A1 | * | 9/2009 | |
| EP | 1394363 | A1 | | 3/2004 | |
| EP | 1734231 | A1 | | 12/2006 | |
| JP | 09268902 | A | * | 10/1997 | ............. F01D 11/00 |
| JP | 2013104414 | A | * | 5/2013 | |

(Continued)

OTHER PUBLICATIONS

European Search Report for EP10150403.

(Continued)

*Primary Examiner* — Edward Look
*Assistant Examiner* — Christopher R Legendre
(74) *Attorney, Agent, or Firm* — Rader, Fishman & Grauer PLLC

(57) ABSTRACT

The guide blades provided for the variable turbine geometry are adjustably arranged within a radial gap through which gases can flow on a moveable carrier ring, which is axially clamped against stops on or in the radial gap with a thrust spring device. According to the invention, the thrust spring device loads the carrier ring on the positions closely adjacent to the stops. The thrust spring device is designed open without sealing function and if applicable combined with a separate seal without thrust function.

16 Claims, 1 Drawing Sheet

(56) References Cited

FOREIGN PATENT DOCUMENTS

| | | | |
|---|---|---|---|
| WO | WO-2007/104535 A1 | 9/2007 | |
| WO | WO-2007/107289 A1 | 9/2007 | |
| WO | WO 2007104535 A1 * | 9/2007 | .............. F01D 17/16 |
| WO | WO-2008/036862 A2 | 3/2008 | |
| WO | WO-2009/003144 A2 | 12/2008 | |

OTHER PUBLICATIONS

English abstract provided for EP-1394363.
English abstract provided for EP-1734231.

* cited by examiner

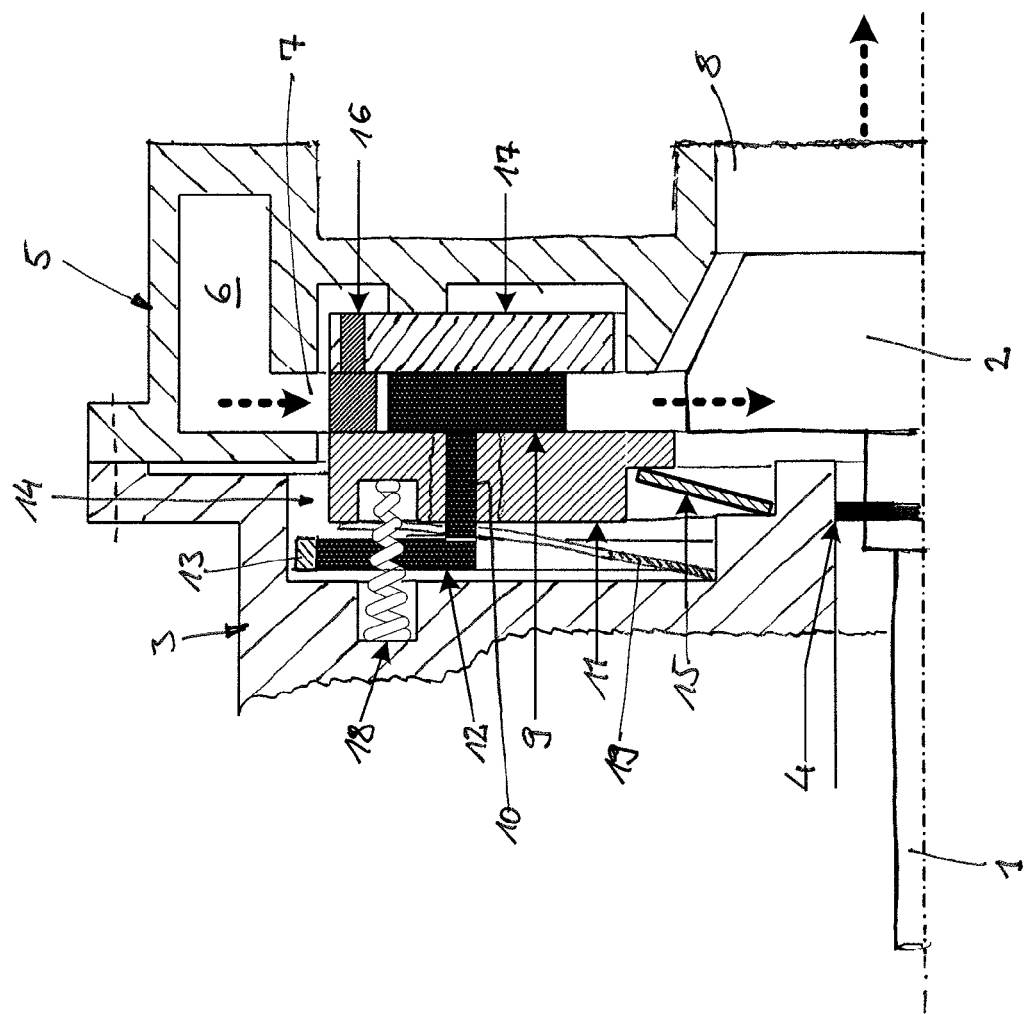

TURBOCHARGER WITH VARIABLE TURBINE GEOMETRY

CROSS-REFERENCES TO RELATED APPLICATIONS

This application claims priority to German patent application DE 10 2009 004 737.9 filed on Jan. 15, 2009, which is hereby incorporated by reference in its entirety.

TECHNICAL FIELD

The invention relates to a turbocharger with variable turbine geometry, wherein in a turbine housing within a radial gap surrounding the turbine wheel in a ring-shaped manner for exhaust and propulsion gasses flowing to the turbine wheel, adjustable guide blades are swivel-mounted on a carrier ring forming a radial wall of the radial gap about axes which are substantially parallel to the turbine wheel axis and the axially moveable carrier ring is axially clamped against stops on the opposite radial wall by an thrust spring device.

BACKGROUND

To increase the performance of the engines, vehicles are equipped with such turbochargers as standard. The adjustable guide blades on the one hand can be put into a position in which the guide blade planes are approximately orientated tangentially to the turbine wheel, on the other hand a position can be adjusted in which the guide blade planes in axial view of the turbine wheel are approximately orientated radially to the turbine wheel axis. The first-mentioned position is adjusted if the exhaust gas flow of the engine is low. The other position is intended for an operating state with high exhaust gas flow. As a result, good efficiency of the turbine can be guaranteed in this manner independent of the intensity of the flow of the exhaust or propulsion gasses.

In terms of design, the guide blade arrangement, i.e. the variable turbine geometry (VTG) can be designed as a cartridge or cage or in another manner.

During turbocharger operation, very high temperatures are present in the radial gap, i.e. all elements or organs arranged adjoining the radial gap or in the radial gap are subjected to extraordinarily high thermal load. For this reason it must be expected that at or in the radial gap greater changes of the dimensions occur through thermal material expansions. In order to avoid distortions through dimensional changes on large assemblies joined as one piece it is practical to segment the walls forming the radial walls of the radial gap and to bring about the cohesion of the segments through resilient clamping. Thus dependent on the temperature each segment is able to change independent of adjoining segments. For this reason the design with a carrier ring clamped against stops by a thrust spring device mentioned at the outset is advantageous.

However, this design can still result in problems since the carrier ring with high thermal load can be deformed to a greater or lesser extent through the forces and counterforces of the thrust spring device and of the stops to which it is subjected. This results in that between the edges of the guide blades on the carrier ring side and the wall of the carrier ring located opposite these edges, gaps can form through which a larger gas flow passes, so that the control effect of the guide blades is reduced. As a result, the efficiency of the turbocharger can be significantly worsened. On the other hand, the opposite case can also occur, i.e. the guide blades can jam.

SUMMARY

It is therefore the object of the invention to create a design wherein the lateral edges of the guide blades on the one hand tightly follow the radial walls of the radial gap and on the other hand jamming of the guide blades is avoided.

According to the invention, this object is solved in that the thrust spring device loads the carrier ring within a ring zone radially or tangentially adjacent to the stops on the side of the carrier ring facing away from the stops.

The invention is based on the general idea of preferably arranging the zones, on which on the one hand forces are moved to the carrier ring by the thrust spring device and on the other hand by the stops, closely adjacent to one another so that the carrier ring is subjected to bending by these forces only to a minor or negligible degree.

According to a preferred embodiment of the invention it can be provided that as thrust spring device a cantilever spring is provided which with a radially inner region is clamped against a housing surface facing the turbine wheel and with leaf spring-like radial cantilever arms arranged star-like is clamped again the carrier ring.

Even if a rotation-symmetrical shape is preferentially provided, such an thrust spring device can be easily adapted to the extensive interference contours which are formed by the control elements and organs for the swivel adjustment of the guide blades on the side of the carrier ring facing away from the guide blades. At the same time the advantage is offered that the thrust spring device is formed by a component connected as one piece.

The thrust spring thus offers an "open wall" that cannot obstruct gas exchange on the side of the carrier ring facing away from the radial gap. If sealing of this space relative to the radial gap is necessary or desired, a seal which is separate from the thrust spring is provided between carrier ring and adjacent housing parts of the turbocharger.

In a practical configuration of the invention the cantilever arms are each arranged in circumferential direction of the carrier ring between neighbouring swivel axes of the guide blades. As for the rest, reference in terms of preferred features of the invention is made to the claims and the following explanation of the drawing, by means of which preferred embodiments of the invention are explained in more details.

Protection is not only claimed for stated or shown feature combinations, but also for principally any combinations of the individual features stated or shown.

BRIEF DESCRIPTION OF THE DRAWING

In the drawing, the only FIGURE shows an axial half section of a turbocharger in the region of its turbine wheel.

DETAILED DESCRIPTION

According to the drawing, the turbocharger according to the invention has a rotor shaft 1 in a fundamentally known manner, which at its one end is connected with a compressor wheel (not shown) in a rotationally fixed manner and with its other end is connected with a turbine wheel 2 in a rotationally fixed manner. The rotor shaft 1 is rotationally mounted in a bearing housing 3, which is only shown in part, wherein the bearings on the turbine wheel side are sealed towards the turbine wheel 2 by a seal 4.

The turbine wheel 2 is accommodated in a turbine housing 5 flanged to the bearing housing 3, which turbine housing comprises a spiral space 6 surrounding the turbine wheel 2 ring-like, into which the exhaust or propulsion gasses driving the turbine wheel 2 can flow in circumferential direction and out of which these gases can flow to the turbine wheel 2 through a ring-shaped radial gap 7 before they flow out of an outlet 8 of the turbine housing 5 in axial direction. Within the radial gap 7, swivel-adjustable guide plates 9 are arranged which can be swivelled between a first end position and a second end position.

The first end position, in which the guide blades form an almost closed ring, is intended for very small exhaust or propulsion gas flows, while the second end position of the guide blades 9 is adjusted with large exhaust or propulsion gas flows. Depending on the intensity of the exhaust or propulsion gas flows, different intermediate positions between the aforementioned end positions are adjusted.

In this manner, the turbine geometry can be varied dependent on flow so that high efficiency can be achieved.

The guide blades 9, with axles 10 arranged on said guide blades in a rotationally fixed manner, which are orientated parallel to the turbine wheel axis and pass through a carrier ring 11 forming a radial wall of the radial gap 7, are swivel-mounted in the carrier ring 11. At its ends facing away from the guide blades 9, the axles 10 are each connected with a swivel lever 12 in a rotationally fixed manner, whose free end is coupled with a control ring 13, central to the turbine wheel axis, so that the swivel levers 12 and thus the guide blades 9 describe a swivel stroke when the control ring 13 describes a rotary stroke with respect to the turbine wheel axis. In principle, the adjusting apparatus of the guide blades can also be embodied in a different manner in order to make possible simultaneous adjustment of all guide blades.

The swivel levers as well as the control ring 12, 13 are accommodated in a control space 14 cleared between the carrier ring 11 and the facing end of the bearing housing 3, which is shielded from the radial gap 7 by the carrier ring 11. On the radially inner region of the carrier ring 11 the control space 14 is sealed gas-tight through a seal 15 arranged between the bearing housing 3 and the carrier ring 11 which can be designed according to the type of a very weak disc spring, so that the control space 14 cannot form a bypass path parallel to the radial gap 7 for the exhaust or propulsion gases. The spring force of the seal 15 is preferentially of such a low dimension that its force is merely sufficient to securely hold the seal 15 between bearing housing and carrier ring. The carrier ring 11 is axially clamped against stops 16 through a thrust spring device, which stops are arranged on the side of the radial gap 7 facing away from the carrier ring 11. According to a preferred embodiment of the invention the radial wall of the radial gap 7 located opposite the carrier ring 11 is formed through a cover disc 17 in the shape of a ring disc, on which the aforementioned stops 16 are arranged, and which is axially clamped against abutments on the turbine housing 5 through the thrust spring device of the carrier ring 11. In addition or alternatively stops, which interact with the cover disc 17, can also be arranged on the carrier ring.

According to a first embodiment of the invention the thrust spring device can be formed through (preferentially chronicle) coil compression springs 18, which are accommodated in blind hole-shaped clearances located axially opposite each other on the ends of the bearing housing 3 facing each other and the carrier ring 11. Although the swivel levers 12 serving for the swivel adjustment of the guide plates 9 and the control ring 13 and adjusting organs (not shown) interacting with these form extensive interference contours which have to be taken into account with the arrangement of the coil compression springs 18, the coil compression springs 18 can be easily arranged relatively far radially outside on the carrier ring 11, so that the coil compression springs 18 are closely arranged radially and in circumferential direction adjacently or, according to a particularly preferred embodiment, also on the same axis as the stops 16. The advantageous effect here is that the coil compression springs 18 only require little accommodation space and can therefore be easily arranged between the swivel regions of adjacent swivel levers 12. The arrangement of the coil compression springs 18 radially adjacent to the stops 16 and in circumferential direction of the carrier ring offers the advantage that the carrier ring 11 can practically not be deformed through the compression forces of the coil compression springs 18 and the counterpressure forces after stops 16 even when subjected to maximum thermal load. More preferably it can thus be ensured that the end of the carrier ring 11 facing the cover disc 17 remains exactly parallel to the facing side of the cover disc 17 so that both the cover disc 17 as well as the carrier ring can continuously follow the lateral edges of the guide blades 9 with very little play and within the radial gap 7 extremely small bypass flows of the exhaust or propulsion gases which are not controlled by the guide plates 9 can occur at the most.

According to a further preferred embodiment of the invention the coil compression springs 18 can be omitted and replaced with a cantilever spring 19, which, with a radially inner ring-shaped region is supported on the turbine wheel end of the bearing housing 3 and clamped against a radially outer ring zone of the carrier ring 11 with cantilever arms arranged star-like. Since the cantilever arms of the cantilever spring 19 in circumferential direction of the carrier ring 11 only require little space, they can be easily arranged between the swivel regions of the swivel levers 12 of adjacent guide blades 9.

The arrangement of the cantilever spring 19 relative to the coil compression springs 18 has the advantage that only a single spring element has to be installed. In addition to this, the cantilever spring 19 in fundamentally the same manner as the coil compression springs 18 offers the advantage that a large spring stroke is made possible in such a manner that the axial forces exerted on the carrier ring 11 can only change very little in the case of possible axial displacement of the carrier ring 11.

Since neither the coil compression springs 18 nor the cantilever spring 19 or cantilever springs form a seal between bearing housing and carrier ring but are "open", a seal 15 which is separate from the thrust spring device is preferably provided.

With all embodiments it is important or advantageous that the seal 15 exclusively has a sealing function and is therefore clamped against the carrier ring 11 only with very little force in such a manner that the seal is securely held between bearing housing and carrier ring.

The invention claimed is:

1. A turbocharger with variable turbine geometry comprising: a radial gap configured for gas flow; and at least one adjustable guide blade, wherein the guide blade is swivel-mounted on an axially moveable carrier ring having a ring axis, thereby forming a radial wall of the radial gap about at least one swivel axis which is substantially parallel to the ring axis; and wherein the carrier ring is clamped against relatively stationary stops by a thrust spring device, such that the thrust spring device loads the carrier ring within a ring zone configured axially adjacent to the stops; wherein the ring zone is on the side of the carrier ring facing away from the stops; and wherein, during operation, a lateral edge of each of the at least one guide blade tightly follows the radial wall of the radial gap, wherein the thrust spring device is a cantilever spring arrangement having a radially inner ring disc region that is clamped against a housing surface of a bearing housing, wherein a plurality of leaf spring-like radial cantilever arms are arranged in a star-like configuration on a region of the carrier ring, and are clamped against the carrier ring.

2. The turbocharger according to claim 1, further comprising a turbine wheel, wherein the radial gap is arranged concentrically to the turbine wheel.

3. The turbocharger according to claim 2, wherein a coil compression spring is configured on a radially outer ring zone of the carrier ring.

4. The turbocharger according to claim 1, wherein the thrust spring device loads the carrier ring in at least one position which is adjacent to the stops in a circumferential direction of the carrier ring.

5. The turbocharger according to claim 4, wherein a coil compression spring is configured on a radially outer ring zone of the carrier ring.

6. The turbocharger according to claim 1, wherein the cantilever arms in the circumferential direction of the carrier ring are configured between the adjacent swivel axes of the guide blades.

7. The turbocharger according to claim 6, wherein a ring disc-shaped seal is configured between at least one housing-sided and one carrier ring-sided annular surface, and wherein the surfaces face each other on the side of the cantilever spring that faces the radial gap axially in front of the ring region of said cantilever.

8. The turbocharger according to claim 1, wherein a ring disc-shaped seal is configured between an annular surface on the housing surface of the bearing housing and an annular surface on the carrier ring, and wherein the surfaces face each other on the side of the cantilever spring that faces the radial gap.

9. The turbocharger according to claim 1, wherein a coil compression spring is configured on a radially outer ring zone of the carrier ring.

10. The turbocharger according to claim 9, wherein at least one non-cylindrical coil compression spring is provided.

11. The turbocharger according to claim 1, wherein a ring disc-shaped seal is configured between at least one housing-sided and one carrier ring-sided annular surface, and wherein the surfaces face each other on the side of the cantilever spring that faces the radial gap axially in front of the ring region of said cantilever.

12. A turbocharger with variable turbine geometry comprising:
a radial gap configured for gas flow; and
at least one adjustable guide blade;
wherein the guide blade is swivel-mounted on an axially moveable carrier ring having a ring axis, thereby forming a radial wall of the radial gap about at least one swivel axis which is substantially parallel to the ring axis;
wherein the carrier ring is clamped against relatively stationary stops by a thrust spring device, such that the thrust spring device loads the carrier ring within a ring zone configured axially adjacent to the stops;
wherein the ring zone is on the side of the carrier ring facing away from the stops; and wherein, during operation, a lateral edge of each of the at least one guide blade tightly follows the radial wall of the radial gap; and
wherein a seal is arranged between a housing surface of a bearing housing and the side of the carrier ring facing away from the guide blades, and wherein the seal loads the carrier ring with a smaller force compared with the thrust spring device.

13. A turbocharger with variable turbine geometry comprising:
a radial gap configured for gas flow;
at least one adjustable guide blade; and
a turbine wheel, the radial gap being arranged concentrically to the turbine wheel;
wherein the guide blade is swivel-mounted on an axially moveable carrier ring having a ring axis, thereby forming a radial wall of the radial gap about at least one swivel axis which is substantially parallel to the ring axis;
wherein the carrier ring is clamped against relatively stationary stops by a thrust spring device, such that the thrust spring device loads the carrier ring within a ring zone configured axially adjacent to the stops;
wherein the ring zone is on the side of the carrier ring facing away from the stops; and wherein, during operation, a lateral edge of each of the at least one guide blade tightly follows the radial wall of the radial gap; and
wherein a ring disc-shaped seal is configured between an annular surface on the housing surface of the bearing housing and an annular surface on the carrier ring, and wherein the surfaces face each other on the side of a cantilever spring that faces the radial gap.

14. A turbocharger with variable turbine geometry comprising:
a radial gap configured for gas flow; and
at least one adjustable guide blade;
wherein the guide blade is swivel-mounted on an axially moveable carrier ring having a ring axis, thereby forming a radial wall of the radial gap about at least one swivel axis which is substantially parallel to the ring axis;
wherein the carrier ring is clamped against relatively stationary stops by a thrust spring device, such that the thrust spring device loads the carrier ring within a ring zone configured axially adjacent to the stops;
wherein the ring zone is on the side of the carrier ring facing away from the stops; and wherein, during operation, a lateral edge of each of the at least one guide blade tightly follows the radial wall of the radial gap;
wherein the thrust spring device loads the carrier ring in at least one position which is adjacent to the stops in a circumferential direction of the carrier ring; and
wherein a ring disc-shaped seal is configured between an annular surface on the housing surface of the bearing housing and an annular surface on the carrier ring, and wherein the surfaces face each other on the side of a cantilever spring that faces the radial gap.

15. A turbocharger with variable turbine geometry comprising:
a radial gap configured for gas flow; and
at least one adjustable guide blade;
wherein the guide blade is swivel-mounted on an axially moveable carrier ring having a ring axis, thereby forming a radial wall of the radial gap about at least one swivel axis which is substantially parallel to the ring axis;
wherein the carrier ring is clamped against relatively stationary stops by a thrust spring device, such that the thrust spring device loads the carrier ring within a ring zone configured axially adjacent to the stops on the side of the carrier ring facing away from the stops;
wherein the thrust spring device is a cantilever spring arrangement having a radially inner ring disc region that is clamped against a housing surface of a bearing housing, wherein a plurality of leaf spring-like radial cantilever arms are arranged in a star-like configuration on a region of the carrier ring, and are clamped against the carrier ring;

wherein the at least one cantilever arm in the circumferential direction of the carrier ring is configured between the adjacent swivel axes of the guide blades; and wherein the thrust spring device is a coil compression spring configured on a radially outer ring zone of the carrier ring.

16. A turbocharger with variable turbine geometry comprising:

a radial gap configured for gas flow; and at least one adjustable guide blade;

wherein the guide blade is swivel-mounted on an axially moveable carrier ring having a ring axis, thereby forming a radial wall of the radial gap about at least one swivel axis which is substantially parallel to the ring axis;

wherein the carrier ring is clamped against relatively stationary stops by a thrust spring device, such that the thrust spring device loads the carrier ring within a ring zone configured axially adjacent to the stops on the side of the carrier ring facing away from the stops;

wherein the thrust spring device is a cantilever spring arrangement having a radially inner ring disc region that is clamped against a housing surface of a bearing housing, wherein a plurality of leaf spring-like radial cantilever arms are arranged in a star-like configuration on a region of the carrier ring, and are clamped against the carrier ring;

wherein a ring disc-shaped seal is configured between an annular surface on the housing surface of the bearing housing and an annular surface on the carrier ring, and wherein the surfaces face each other on the side of the cantilever spring that faces the radial gap; and wherein the thrust spring device is a coil compression spring configured on a radially outer ring zone of the carrier ring.

* * * * *